(12) United States Patent
Alvarez

(10) Patent No.: US 7,826,535 B2
(45) Date of Patent: Nov. 2, 2010

(54) ADAPTIVE PIXEL PROCESSING

(75) Inventor: José Roberto Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1393 days.

(21) Appl. No.: 10/120,622

(22) Filed: Apr. 11, 2002

(65) Prior Publication Data

US 2003/0194013 A1    Oct. 16, 2003

(51) Int. Cl.
   *H04N 7/12*    (2006.01)
   *H04N 11/02*   (2006.01)
(52) U.S. Cl. .............................. 375/240.26; 375/240.29
(58) Field of Classification Search ............ 375/240.26, 375/240.24, 240.29, 240.08, 240.1; 348/607, 348/608, 618, 408, 402.1
   See application file for complete search history.

(56) References Cited

U.S. PATENT DOCUMENTS

| | | | | |
|---|---|---|---|---|
| 5,603,012 | A * | 2/1997 | Sotheran | 712/208 |
| 5,719,961 | A * | 2/1998 | Normile et al. | 382/239 |
| 5,917,964 | A * | 6/1999 | Normile | 382/300 |
| 6,335,990 | B1 * | 1/2002 | Chen et al. | 382/261 |
| 6,538,656 | B1 | 3/2003 | Cheung et al. | 345/519 |
| 6,539,060 | B1 * | 3/2003 | Lee et al. | 375/240.29 |
| 2001/0046260 | A1 | 11/2001 | Molloy | |

OTHER PUBLICATIONS

Bose S et al, "A Single Chip Multistandard Video Codec", Custom Integrated Circuits Conference, 1993, Proceedings of the IEEE 1993 San Diego, CA, USA May 9-12, 1993, New York, NY, USA, IEEE, pp. 1141-1144, XP010222103 ISBN: 0-7803-0826-3.

Lee B W et al, "Data Flow Processor for Mutli-Standard Video Codec", Custom Integrated Circuits Conference, 1994, Proceedings of the IEEE 1994 San Diego, CA, USA, May 1-4, 1994, New York, NY, IEEE, pp. 103-106, XP010129914 ISBN: 0-7803-1886-2.

Sullivan G, "Draft Text of Recommendation H.263 Version 2 (H.263+) for Decision", Jan. 27, 1998, ITU-T Draft Recommendation H.263 Ver. 2, pp. A, B, 144, XP000956345.

Alves De Barros M et al, "Low Level Image Processing Operators on FPGA: Implementation Examples and Performance Evaluation", Proceedings of 12th International Conference on Pattern Recognition, IEEE, Oct. 9, 1994, pp. 262-267, XP010216394.

Bernacchia G et al, "A VLSI Implementation of a Reconfigurable Rational Filter", IEEE Transactions on Consumer Electronics, IEEE Inc. New York, NY, USA, vol. 44 No. 3, Aug. 1998, pp. 1076-1085, XP000851623 ISBN:0098-3063.

(Continued)

Primary Examiner—David Czekaj
(74) Attorney, Agent, or Firm—McAndrews, Held & Malloy, Ltd.

(57) ABSTRACT

A system (5) processes pixel data representing one of a first image compressed according to a first compression algorithm and a second image compressed according to a second compression algorithm. A pixel analyzer (32) generates first and second selection signals depending on the type of image. A processing module (40) includes first circuits arranged to process the data in response to a first selection signal and second circuits arranged to process the data in response to a second selection signal. A control processor (10) enables the first circuits in response to the first selection signal and enables the second circuits in response to the second selection signal.

18 Claims, 10 Drawing Sheets

OTHER PUBLICATIONS

"Information Technology-Coding of Audio-Visual ISO/IEC 14496-2", International Organization for Standardization, No. N2202, Mar. 1998, pp. 1-329, XP000861689.

U.S. Appl. No. 09/437,208 entitled "Graphics Display System", filed Nov. 9, 1999, Inventor: Alexander G. MacInnis et al.

U.S. Appl. No. 09/641,374 entitled "Video, Audio and Graphics Decode, Composite and Display System", filed Aug. 18, 2000, Inventor: Alexander G. MacInnis et al.

U.S. Appl. No. 09/641,936 entitled "Video and Graphics System With an MPEG Video Decoder for Concurrent Multi-Row Decoding", filed Aug. 18, 2000, Inventor: Ramanujan K. Valmiki et al.

U.S. Appl. No. 09/643,223 entitled "Video and Graphics System With MPEG Specific Data Transfer Commands", filed Aug. 18, 2000, Inventor: Ramanujan K. Valmiki et al.

U.S. Appl. No. 09/640,670 entitled "Video and Graphics System With Video Scaling", filed Aug. 18, 2000, Inventor: Alexander G. MacInnis et al.

U.S. Appl. No. 09/641,930 entitled "Video and Graphics System With A Video Transport Processor", filed Aug. 18, 2000, Inventor: Ramanujan K. Valmiki et al.

U.S. Appl. No. 09/641,935 entitled "Video and Graphics System With Parallel Processing of Graphics Windows", filed Aug. 18, 2000, Inventor: Alexander G. MacInnis et al.

U.S. Appl. No. 09/642,510 entitled "Video and Graphics System With A Single-Port RAM", filed Aug. 18, 2000, Inventor: Xiaodong Xie.

U.S. Appl. No. 09/642,458 entitled "Video and Graphics System With an Integrated System Bridge Controller", Inventor: Alexander G. MacInnis et al., filed Aug. 18, 2000.

\* cited by examiner

BINARY OUTPUT
(1 IF CONDITION IS TRUE)

INPUT 2'S COMPLIMENT → ABS → ABSOLUTE VALUE

SELECT ONE OF N

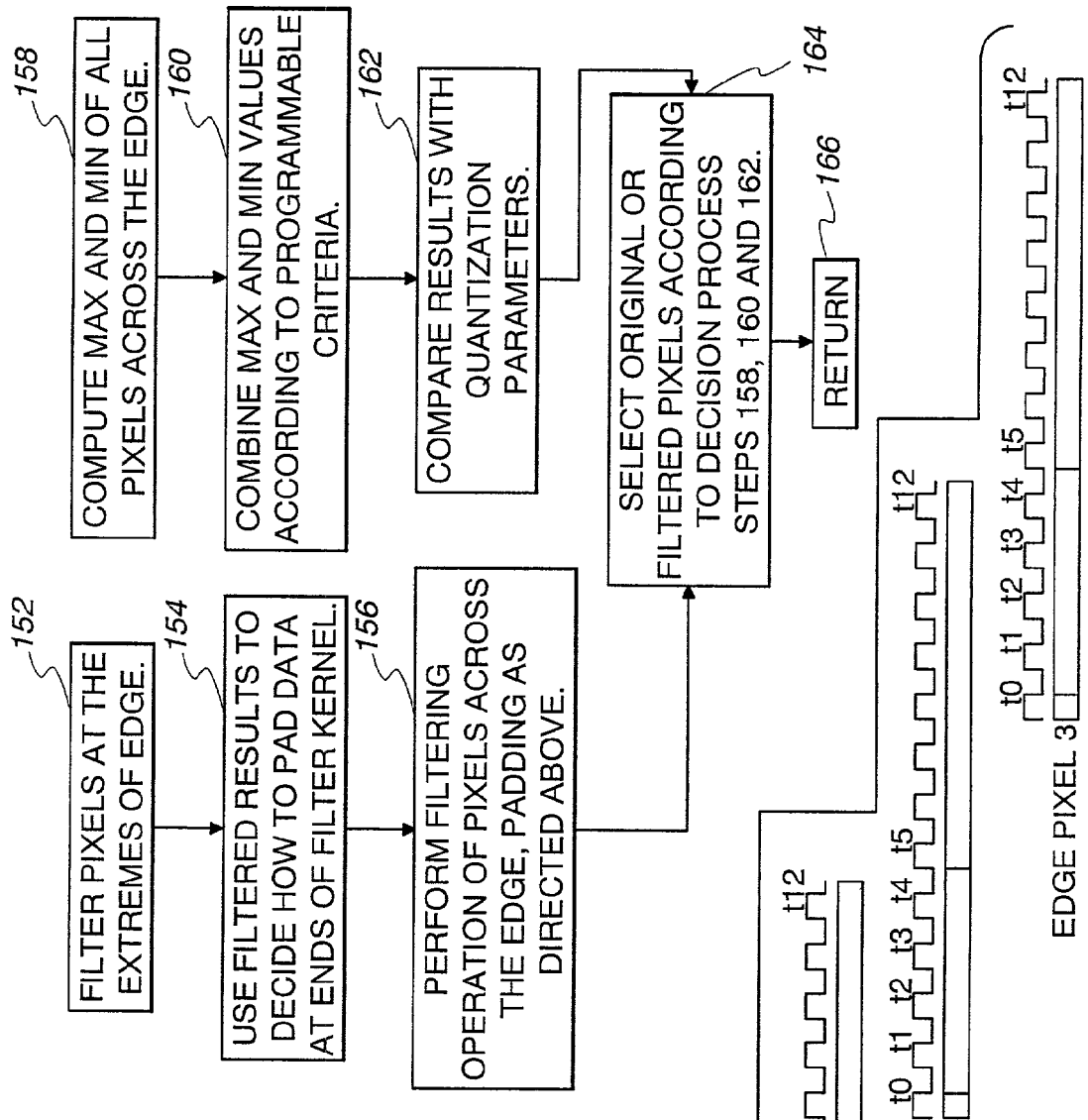

ADAPTIVE PIXEL PROCESSING

BACKGROUND OF THE INVENTION

This invention relates to digital processing of decompressed pixel data and more particularly relates to adapting such processing in response to analysis of the pixel data.

Video images frequently are compressed in order to reduce the bandwidth required for transmission. The compression typically is performed by one of several compression algorithms, such as MPEG-1, MPEG-2, MPEG-4, H.263, H.263+, H.26L, and proprietary algorithms. Such algorithms can result in blocks of data with low bit rates. However, when the blocks are decoded or decompressed, they are likely to result in objectionable artifacts that manifest themselves as blockiness, high frequency noise and ringing along edges of objects and banding in smoothly varying areas of an image. Each compression algorithm may include some form of filtering, including loop filtering or post filtering. At the present time, the filtering is implemented purely in software or firmware or as dedicated hardware for each algorithm. There is a need for hardware that can be internally configured to execute a variety of dynamic filtering algorithms. This invention addresses the need and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful for processing data representing a first image compressed according to a first compression algorithm and a second image compressed according to a second compression algorithm, the first and second images each comprising pixels. In such an environment, the processing can be facilitated by providing apparatus comprising a processing module including first circuits arranged to process the data and second circuits arranged to process the data. A processor is arranged to enable at least a portion of the first circuits and to disable at least a portion of the second circuits in response to a first selection signal in the event that the data represents the first image and to enable at least a portion of the second circuits and to disable at least a portion of the first circuits in response to a second selection signal in the event that the data represents the second image.

One method embodiment of the invention is useful in a system comprising first circuits and second circuits for processing data representing a first image comprising pixels compressed according to a first compression algorithm and a second image comprising pixels compressed according to a second compression algorithm. In such an environment, the method comprises processing the data with the first circuits in response to a first selection signal in the event that the data represents the first image and processing the data with the second circuits in response to a second selection signal in the event that the data represents the second image. At least a portion of the first circuits are enabled and at least a portion of the second circuits are disabled in response to the first selection signal. At least a portion of the second circuits are enabled and at least a portion of the first circuits are disabled in response to the second selection signal.

By using the foregoing techniques, the processing of data compressed according different compression algorithms can be achieved with a degree of speed and economy previously unavailable.

These and other advantages and novel features of the present invention, as well as details of an illustrated embodiment thereof, will be more fully understood from the following description and drawings.

BRIEF DESCRIPTION OF THE DRAWINGS

FIG. 13 is a flow diagram illustrating the operation of the mode 2 processing module shown in FIG. 12.

FIG. 14 is a timing diagram illustrating time periods involved in the operation of the mode 2 processing module shown in FIG. 12.

DETAILED DESCRIPTION OF THE INVENTION

Figure 1:
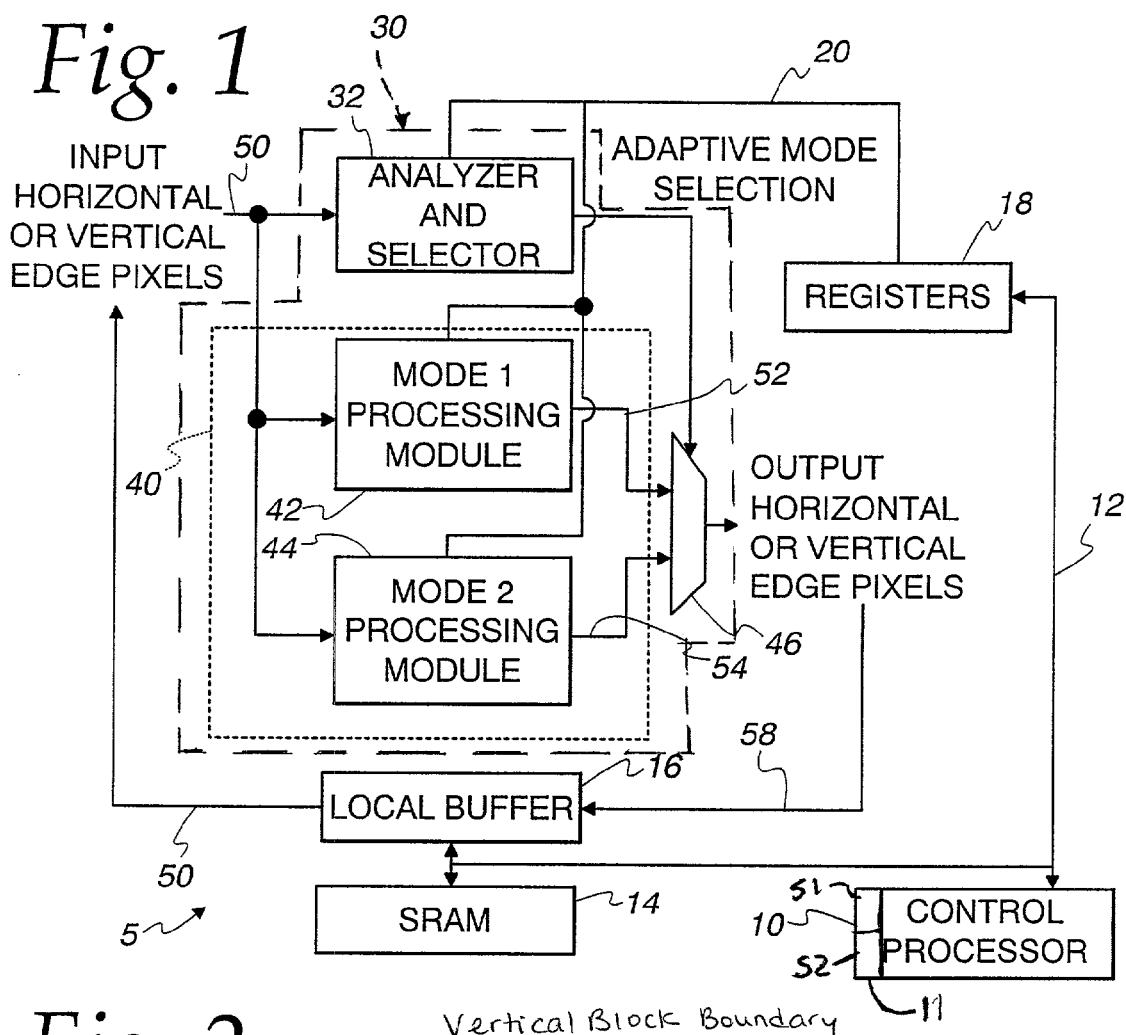
FIG. 1 is a schematic block diagram of one form of the invention, including an analyzer, mode 1 processing module and a mode 2 processing module.

Referring to FIG. 1, a system 5 for processing data according to one embodiment of the invention comprises a control processor 10 with a memory 11 that communicates over a conventional bus 12 with a static random access memory (SRAM) 14, a buffer memory 16 and a group of registers 18. The group of registers is coupled over a bus 20 to a dynamic digital filter 30, including an analyzer and selector 32, a processing module 40 that comprises a mode 1 processing module 42 and a mode 2 processing module 44, and a multiplexer 46. Additional processing modules for processing additional modes may be added as needed.

Input horizontal or vertical edge pixels are transmitted from buffer 16 to analyzer 32 over a bus 50. Output paths 52 and 54 transmit processed pixels from module 42 and module 44, respectively, to multiplexer 46 as shown. Processed output horizontal or vertical edge pixels are transmitted from the output of multiplexer 46 to buffer 16 over a bus 58 as shown.

Filter 30 shown in FIG. 1 performs a variety of filtering functions to reduce artifacts due to low bit rate compression. Filter 30 requires minimal involvement from control processor 10 and provides flexibility in implementing various filtering schemes at the block and macroblock levels. Filter 30 is programmable in its coefficients and size. Processing is controlled dynamically based on input characteristics of pixels and includes pixel filtering and loop filtering. Filter 30 works with SRAM 14 and buffer 16 in a flexible way to enable filtering along horizontal edges and vertical edges of pixels blocks or macroblocks. Registers 18 and filter 30 can be implemented on a single chip that can act as an in-the-loop filter and a post-filter on a block or macroblock basis.

Filter 30 makes use of basic image processing modules interconnected and controlled in a way to provide different degrees of artifact reduction. Filter 30 is transformed by the settings of registers 18 to perform various processing algorithms. A particular algorithm is represented as a set of register bits that are programmed by control processor 10, if necessary, on a macroblock basis. Filter 30 decodes multiple filtering algorithms (e.g., loop, pixel, and post-processing algorithms) with flexible hardware and is programmable to allow future decoding algorithms. The decoding algorithms are expressed via programming of control bits in registers 18. Filter 30 accelerates pixel-based operations at a high level of abstraction, and handles memory accesses flexibly for horizontal edges and vertical edges of blocks and macroblocks of pixels. Filter 30 easily can be interfaced to control processor 10.

This specification describes typical deblocking algorithms used in the industry. Filter 30 allows substantial programmability in order to support a variety of algorithms beyond the two examples provided. Thus, the invention is not limited to the examples provided in this specification.

Filter 30 is able to implement the MPEG-4 deblocking filter that is described in ISO/IEC 14496-2, Generic coding of Audio-Visual Objects. Part 2: Visual (2000) which is incorporated by reference in this specification in its entirety. Filter 30 is able to implement the H.263 deblocking filter described in ITU-H.263v2, Video coding for low bit rate communication (February 1998) which is incorporated by reference in this specification in its entirety.

The target video format for deblocking examples described in this specification follows what is widely known as the 525-line/625-line Digital Video Interface Format. In this format a video sequence consists of frames 720×480@ 30 Frames/sec or 720×576@ 25 Frames/sec, both sampled in the 4:2:0 YCbCr sampling. The processing budget for each block in the frame is based on a 4:2:0 sampling structure. Since deblocking operates on block edges, it is implied that each edge has a budget of 125 Clock cycles and each edge pixel has a processing budget of 15 clocks (both assuming a 121.5 MHz clock rate). Therefore, the hardware of filter 30 cannot spend more than 15 clock processing cycles for each of the 32 pixels along the edge of the 8×8 blocks.

Filter 30 is designed to operate as a Loop or Post Filter. In order to accommodate the wide variety of coding algorithms, the filter affords highly programmable blocks that can be arranged to perform many processing methods. Filter accesses pixel data in two-dimensional arrays of various sizes, as the length of filters is fully programmable to a specified maximum range and the affected pixels are located across block boundaries.

Filter 30 performs the following functions:

Fetches current and adjacent block data from SRAM memory (alternatively, it is possible to fetch a non-symmetrical number of pixels across the block edge);

Performs multiple segment frequency domain analysis for every pixel along a block edge;

Selects a particular operating mode depending on the results of the frequency analysis;

Programs the size and coefficient values of the frequency analysis filters for the algorithms of interest;

Processes each pixel along a macroblock edge with a smoothing FIR filter;

Programs the size and coefficient values of the smoothing filter for the algorithms of interest;

Replaces each pixel along the edge of the block, if necessary, based on the results of filtering neighboring pixels;

Replaces the pixels neighboring each edge pixel, if necessary, by values determined by a table lookup, or by values determined by the decision circuits within the processing modules;

Decides which combination of filters to use on a pixel-by-pixel basis for every pixel along the edges of the block; and Performs deblocking on horizontal and vertical edges separately, or sequentially using the already processed results on one edge for the processing results of another (recursive filtering operation).

Filter 30 follows a processing sequence along the block edges. In most cases, the horizontal edge is processed first and the resulting data is written back to the same locations where it came from in buffer 16 (read-modify-write operation). Once the horizontal edge is processed, the data is read back from buffer 14 for processing along the vertical edge. Alternatively, the vertical edge can be processed before the horizontal edge. The deblocking is not done until both horizontal and vertical edge pixels are fully processed.

The processed region can be thought of as resulting from an FIR filtering operation. However, as the size of the processed region along the edges grows, the values of the pixels towards the ends of the FIR structure are defined and are replaced with values that minimize step discontinuities.

Figure 2:
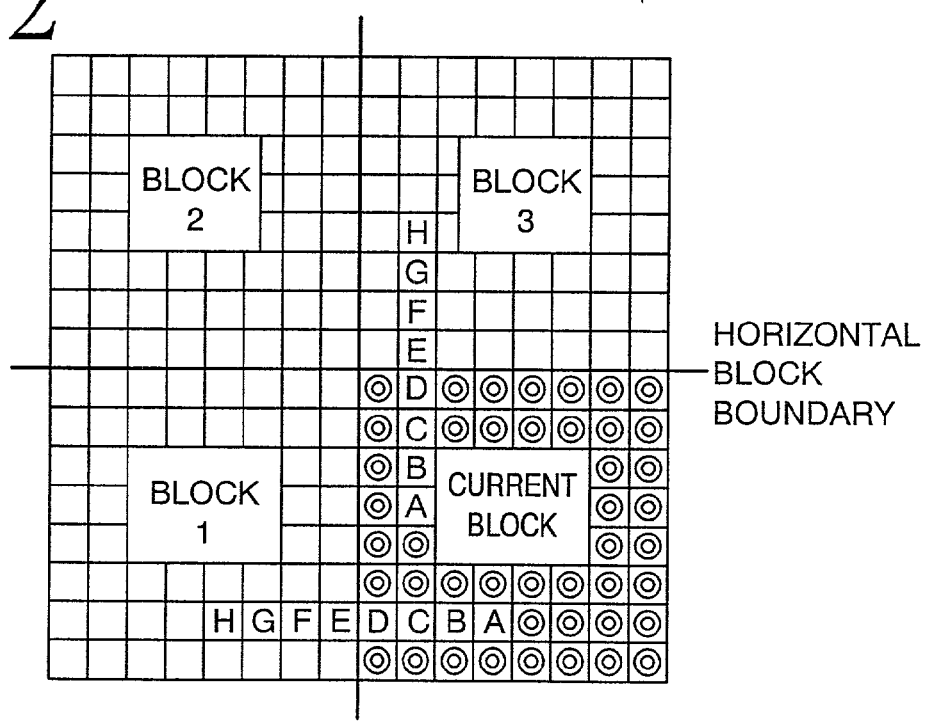
FIG. 2 illustrates one arrangement of blocks of pixel data that can be processed by the apparatus shown in FIG. 1.
Figure 3:
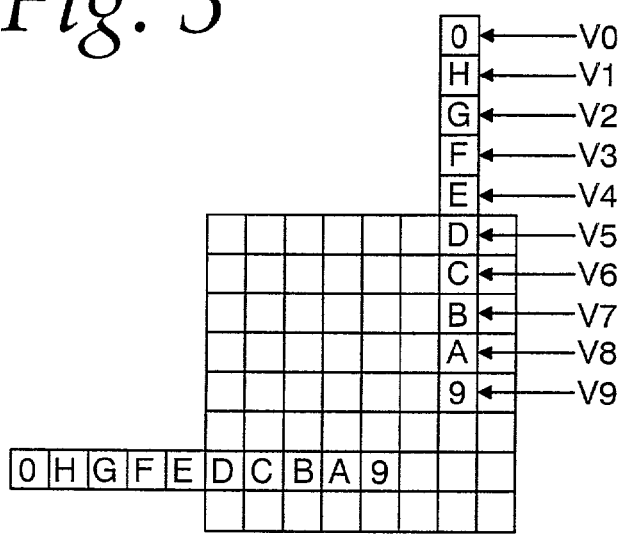
FIG. 3 illustrates vertical and horizontal groups of pixels that may be processed by the apparatus shown in FIG. 1.

Referring to FIGS. 2 and 3, in order to keep the nomenclature simple, the edge pixels are labeled with capital letters. The main edge pixels in the 8×8 block are A-H, with bordering pixels denoted as 0 and 9. The arrows with V labels refer to the nomenclature used in MPEG-4. An 8×8 block consists of either luminance or chrominance components, therefore, there are two sets of registers for filter 30.

FIGS. 4A-4I are schematic block diagrams of individual processing blocks shown in one or more of FIGS. 5, 8, 9 and 12 in short hand notation. The description of these blocks is as follows.

Division Operators

In this specification, there are two symbols used to denote division:

The symbol "/" means division by an integer factor with truncation towards zero; i.e., 7/4 truncates to 1 and −7/4 truncates to −1.

When "//" is used, it means division with rounding to the nearest integer away from zero. For instance, 3//2 rounds to 2 and −3//2 rounds to −2.

All references to blocks labeled as "D" (for example, 246 and 247) are passive delay elements that remain active at all times, regardless of the register settings. These delays serve to illustrate how someone skilled in the art would match various processing paths in order to operate at the same clock times as other modules that process data in parallel. The timing "t" labels indicate the relative processing times between different processing paths.

Sign Reversal—Two's Complement Inverse

Performs the equivalent arithmetic as changing the sign of the input data

Two-Port Comparator

Figure 4A:
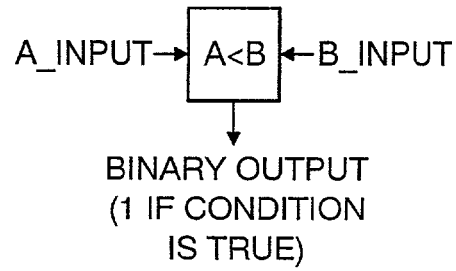
FIGS. 4A-4I are schematic block diagrams of processing blocks shown in other Figures.

The comparator shown in FIG. 4A outputs a binary value (1=TRUE, 0=FALSE) depending on the result of the condition.

Absolute Value Operator

Figure 4B:
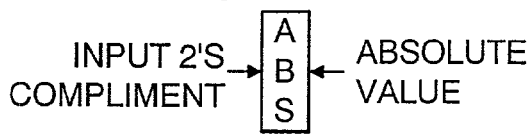

The absolute value operator shown in FIG. 4B always outputs a positive value of the two's complement input data.

Multiple Input Selector

Figure 4C:
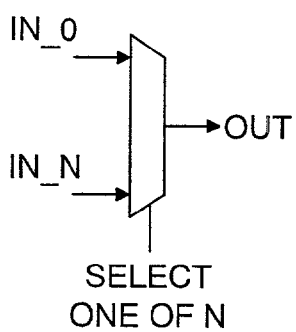

The selector shown in FIG. 4C multiplexes a number of inputs into a single output depending on the value of the selector port.

Clipping Block

Figure 4D:
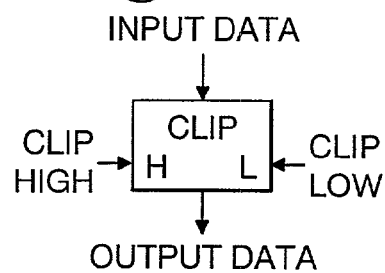

The output of the clipping block shown in FIG. 4D is less than or equal to H and greater than or equal to L.

Power-of-2 Multiply/Divide

Figure 4E:
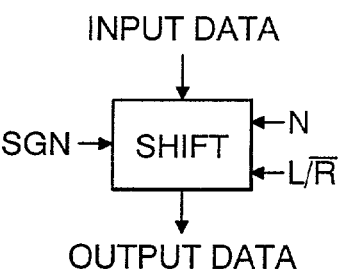

The power-of-2 circuit shown in FIG. 4E performs shift-left multiply or shift-right divide by a factor of 2 determined by n. If the value of sgn=0, the absolute value of the multiply/divide operation is the resulting output. This block is labeled ShiftMD in the specification text.

Power-of-2 FIR Filter

Figure 4F:
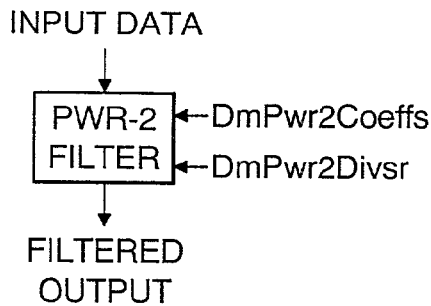

The filter shown in FIG. 4F computes the FIR filter of all the input pixels using a set of coefficients that defines powers-of-2 multipliers. The Divisor input scales down the result with rounding.

Min/Max Operators

Figure 4H:
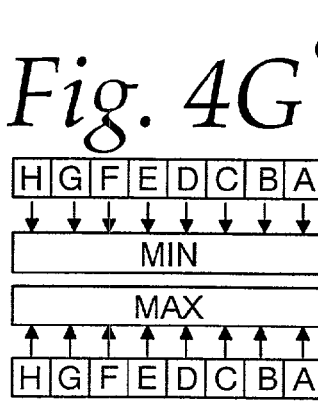
Figure 4G:
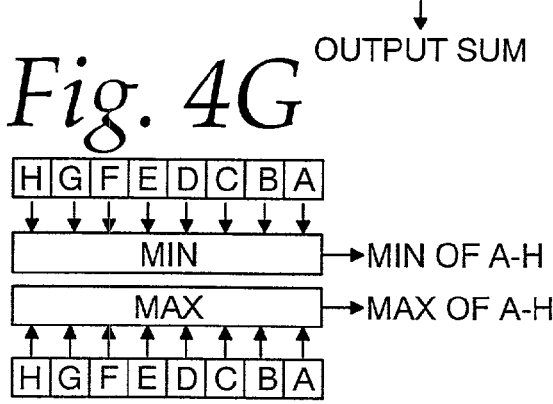

The operators shown in FIG. 4G output the minimum or maximum value of all the input data.

Sum Operator

The sum operator shown in FIG. 4H inputs a plurality of data and outputs the total sum of all inputs.

Look-Up Table (LUT)

Figure 4I:
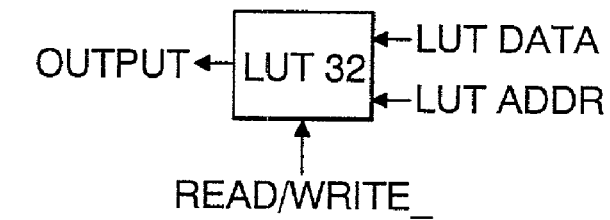

The table shown in FIG. 4I comprises a 32-location RAM that can be written or read via the address and data pins.

FIGS. 5, 8, 9 and 12 show the signal processing flow for each the various modules of filter 30. The input pixel data is 8-bit wide, and filter coefficients are 9-bit two's complement unless otherwise specified. The internal processing paths should be allowed an accuracy of two fractional bits and all intermediate results should be rounded appropriately.

Timing relationships are not indicated in FIGS. 5, 8, 9 and 12; however, those skilled in the art know how to properly delay and synchronize data internally so that data are at the correct processing stage along the processing path.

When filtering is done at the boundaries of the picture (or Video Object Plane (VOP)), three selectable modes are available. The first one follows simple padding with a constant value at the edge of the filter. For example, using the nomenclature above, the values of pixels H, G, F, E would be set to a constant value, for instance 'zero'. The second method repeats the value of the pixel at the VOP edge, so the values of H, G, F, E would be set to D. The third method follows the mirroring technique used in pixel filtering during or prior to motion compensation; namely, the values of H, G, F, E are set respectively to A, B, C, D. Mode selection is done via the control register for this module.

In general, the intermediate precision of filtering operations is preserved to at least three significant fractional bits. Rounding is done to the nearest integer, away from zero (e.g., ½ rounds to 1 and −½ rounds to −1).

Figure 5:
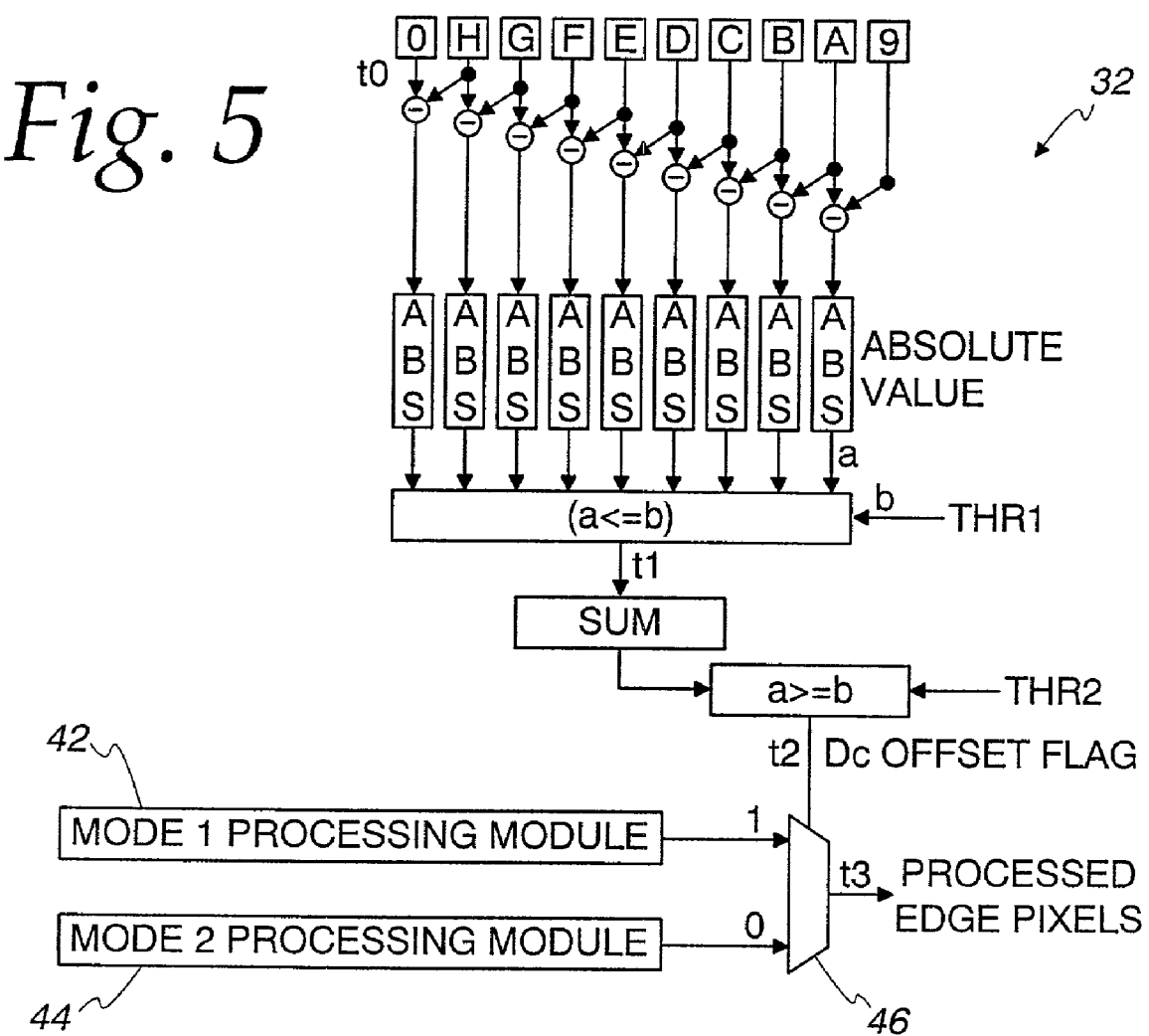
FIG. 5 is a schematic block diagram of the analyzer shown in FIG. 1.

Referring to FIG. 5, the type of deblocking filter is chosen adaptively according to the nature of the edge pixels. The boxes labeled 9, A-H and O indicate input pixels to the analyzer module. There are several criteria possible in this architecture, all determined by setting the appropriate registers. The criterion is chosen by two threshold registers Thr1 and Thr2. The labels starting with 't' indicate clock times at which the data is valid at the specific point in the processing path. For instance, in FIG. 5, the input data is available at clock t0 and a proper selection of the operating mode (based on the high frequency information in the input pixels) is available at clock t2. The selection is registered for the duration of the processing time for each edge result.

The data to be filtered is entered in SRAM 14 by control processor 10 or by another suitable memory controller module. The data is organized in frames, and a single frame typically includes images compressed according to only a single algorithm, such as MPEG-4 or H.263. Processor 10 typically generates a first selection signal S1 if the frame includes data compressed according to the H.263 algorithm and a second selection signal S2 if the frame includes data compressed according to the MPEG-4 algorithm. Generating the first and second selection signals may involve reading signals S1 and S2 from memory 11. Other processing circuitry (not shown) that determines whether a frame was compressed according to the H.263 or MPEG-4 algorithm may place signals S1 and S2 in memory 11. In order to start the filtering of a frame, processor 10 moves a suitable block of the data from the frame into buffer 16 and sets the values of registers Thr1 and Thr2 so that analyzer 32 is able to detect the type of filtering needed for data compressed with various compression algorithms used to compress the data in the frame. For example, the values of the control registers 18 may be set to process input pixels according to the algorithms used in MPEG-4 or H.263.

If the H.263 algorithm was used for the frame, then mode 1 processing module 42 will be used to filter the entire frame, with the proper programming of the registers that control the operation of module 42. However, if the MPEG-4 algorithm was used for the frame, both mode 1 processing module 42 and mode 2 processing module 44 may be used, depending on the results of analysis of blocks of pixels within the frame performed by analyzer 32. As a result, if processor 10 determines that MPEG-4 compression was used for the frame, processor 10 resets the values of registers Thr1 and Thr2 (FIG. 5) to determine the processing mode needed for blocks of pixels within the MPEG-4 frame. Processor 10 then transmits pixel data from SRAM 14 to buffer 16 (FIG. 1), and transmits suitable pixels from buffer 16 to analyzer 32.

Figure 6:
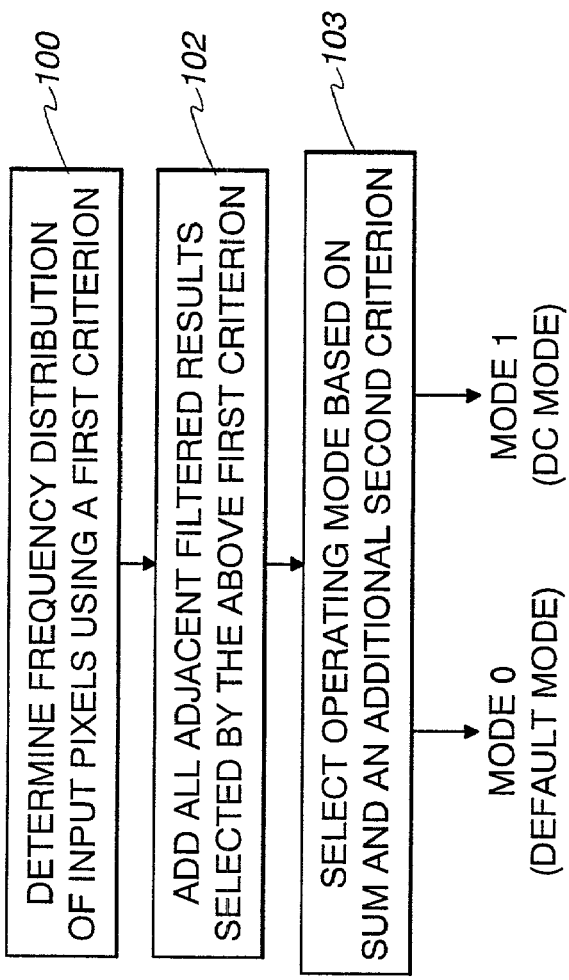
FIG. 6 is a flow diagram illustrating the analyzing performed by the analyzer shown in FIG. 5.

Referring to FIG. 6, in a step 100, analyzer 32 determines the frequency distribution of the input pixels using a first criterion defined by the value in register Thr1. For example, the value of the Thr1 register can be set to a number from 0 to 255, and typically with a value less than 16. In a step 102, analyzer 32 adds all adjacent filtered results selected by the first criterion. The adding is performed by the sum block shown in FIG. 5. In a step 103, analyzer 32 selects an operating mode based on the sum and an additional second criterion defined by the value of the Thr2 register. For example, the value of Thr2 can vary from 0 to 9, and typically is set to 6. The operating mode selected results in one of two DC offset flag values that comprise mode selection values. A zero value selects the results from mode 1 processing module 42 and a one value selects the results from mode 2 processing module 44.

Figure 7:
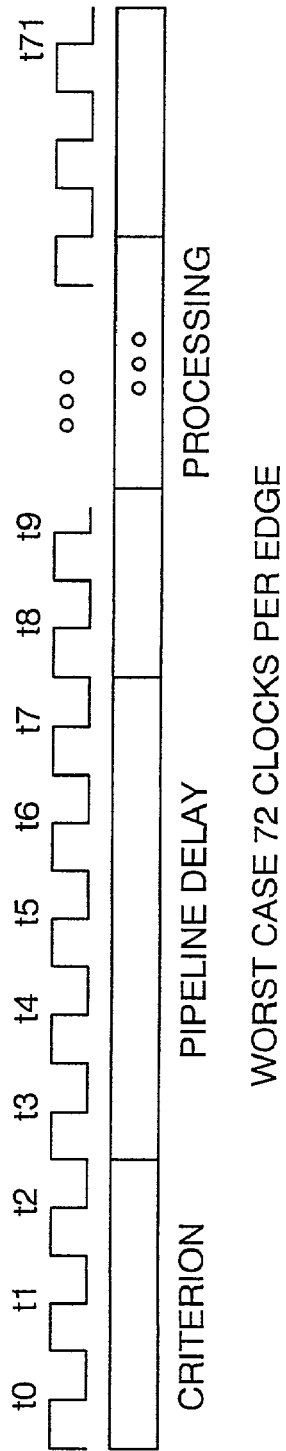
FIG. 7 is a timing diagram illustrating time periods of operation of the analyzer shown in FIG. 5.
Figure 8A:
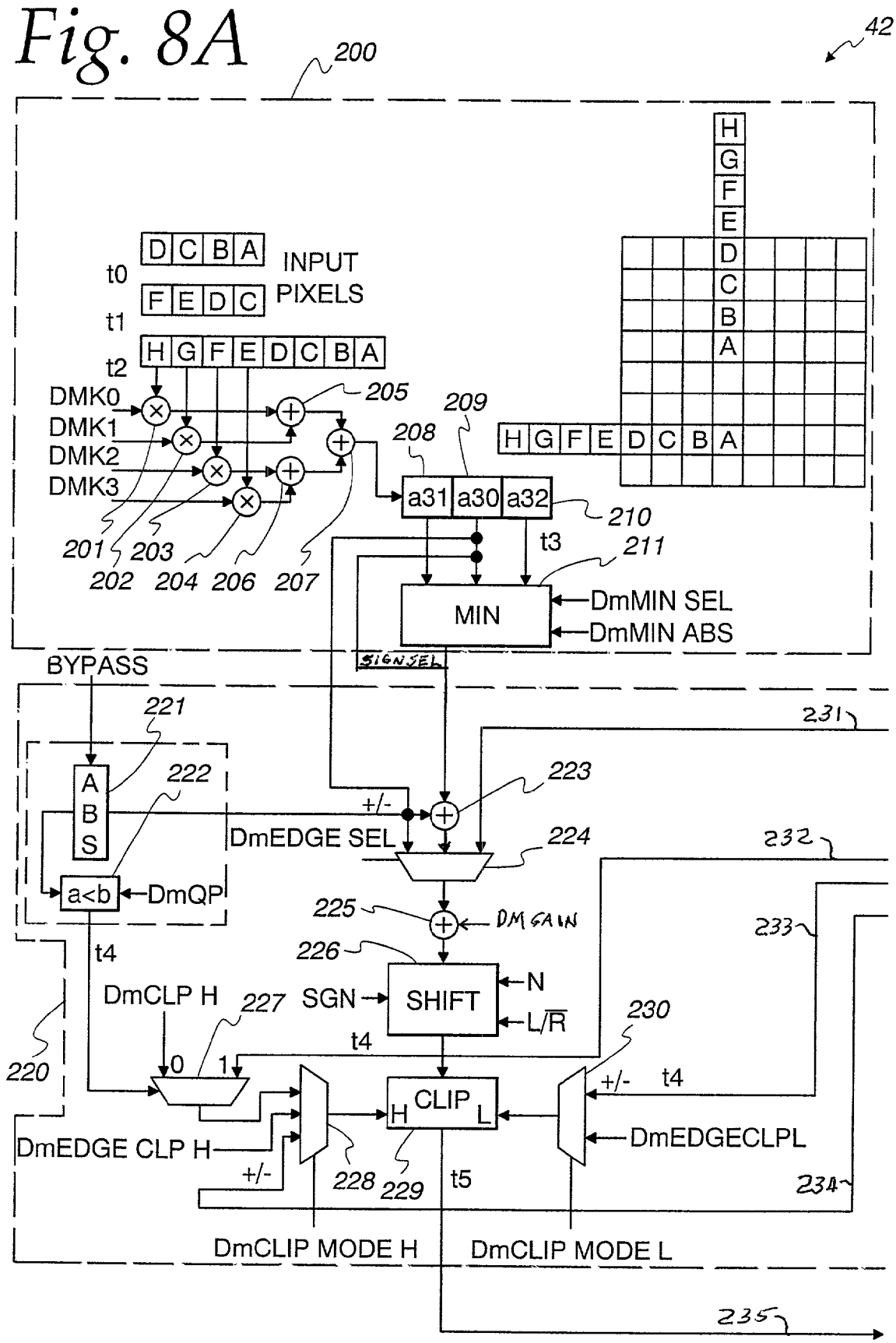
FIG. 8 is a schematic block diagram of the mode 1 processing module shown in FIG. 1.
Figure 8B:
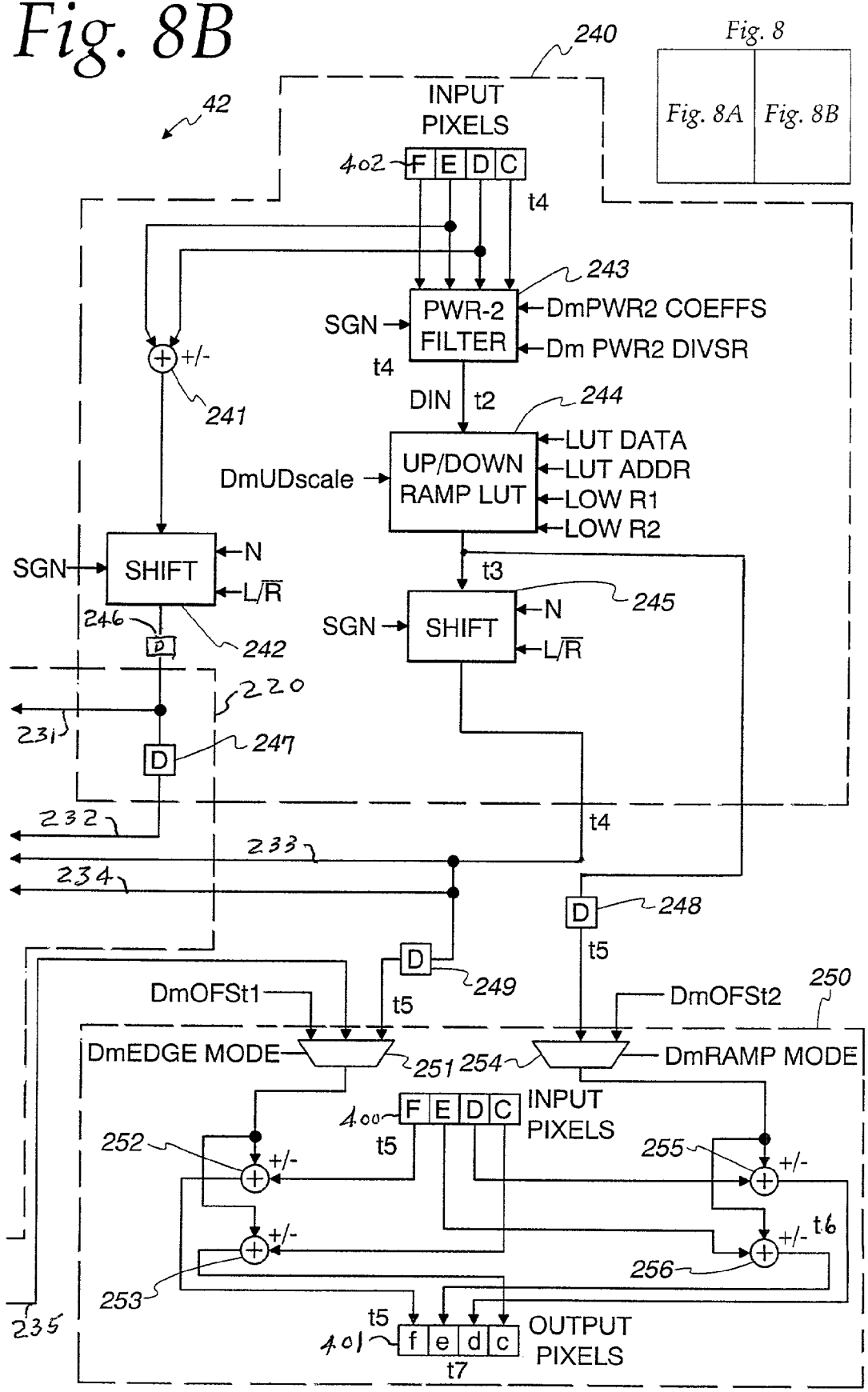

FIG. 7 shows the clock cycles t0-t2 that are used to do the analysis necessary to set the DC offset flag value, the clock cycles t3-t7 that are used for pipe line delay and the clock cycles t10-t71 that are used for processing by modules 42 and 44. The number 71 comes from one embodiment of the processing (in the hardware indicated in the Figures) of 10 pieces of data (9, A, B, . . . , H, 0) with an initial setup of one clock and 7 clocks per data (1+10*7). But 71 clock cycles are for this particular embodiment, and someone skilled in the art may have more or less delay depending on the hardware resources allocated for the task. The pipe line delay is caused by the minimum processing delay of module 42 or module 44 required to produce the first valid data. For example, module 42 takes 7 clock cycles to produce the first valid processed pixel data, whereas module 44 takes 12 clock cycles to produce the first processed pixel.

Referring to FIG. 8, the mode 1 processing module 42 is used when the edge gradient between blocks of pixels is such that the average DC values of adjacent blocks does not warrant replacement (filtering) of all pixels along the edge. The input pixels, whether along the horizontal or vertical edge, are denoted by capital letters A-H. The output pixels are combination of original (input) pixels and processed pixels, depending on the adaptive selection for each edge pixels. Filtering is performed by module 42 for each pixel along the edge. Output pixels are denoted by lower-case letters c-f. The labels starting with 't' indicate clock times noted as examples for data path synchronization. Module 42 includes processing blocks 201-211, 223-230, 241-249 and 251-256 arranged as shown. A circuit block 200 includes processing blocks 201-211, a circuit block 220 includes processing blocks 221-230, a circuit block 240 includes processing blocks 241-249 and a circuit block 250 includes processing blocks 251-256. Conductors 231-235 interconnect some of the blocks as shown.

Figure 9:
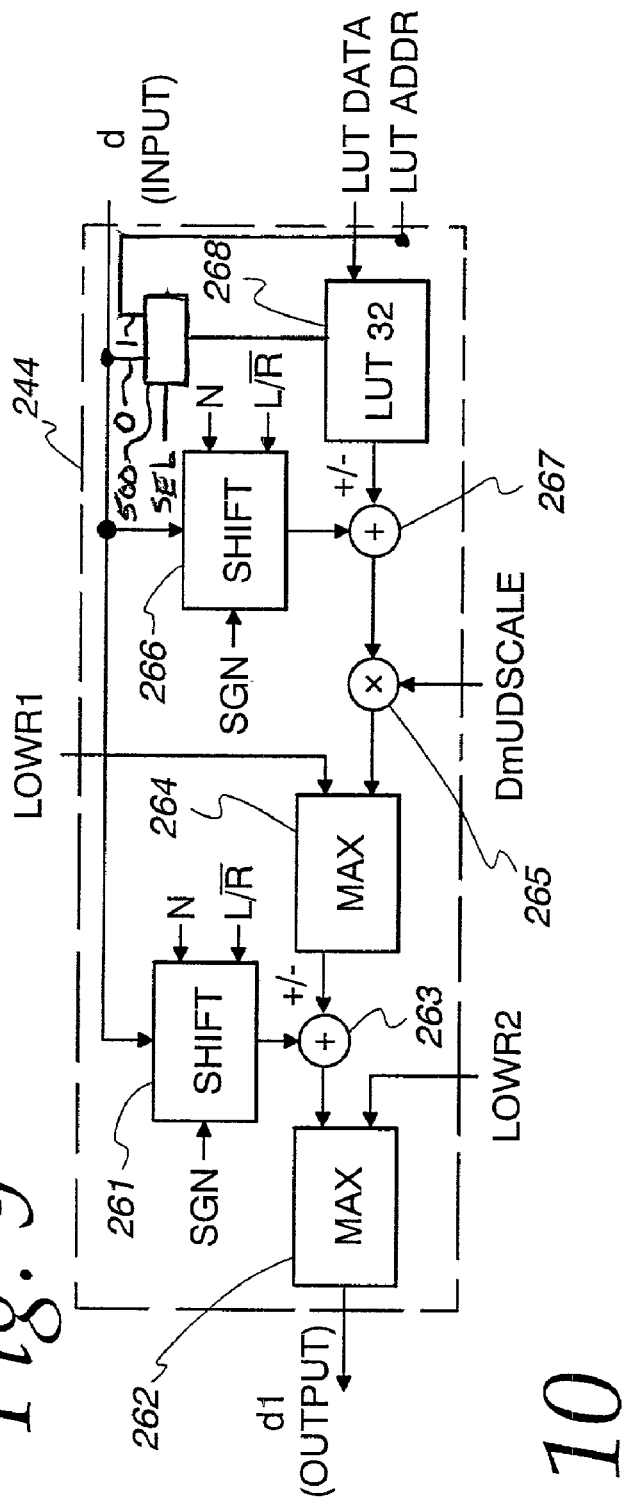
FIG. 9 is a schematic block diagram of the Up/Down Ramp LUT shown in FIG. 8.

Referring to FIG. 9, the Up/Down Ramp Look-Up-Table (LUT) 244 is used by some deblocking algorithms to indicate relative strength of pixels along the edge of a block. The selection is determined by the register settings LowR1 and LowR2. LUT 244 includes processing blocks 261-268 connected as shown. A multiplexer 500 inputs to LUT 268 either the LUT address or the d input depending on the value of the SEL line.

Figure 10:
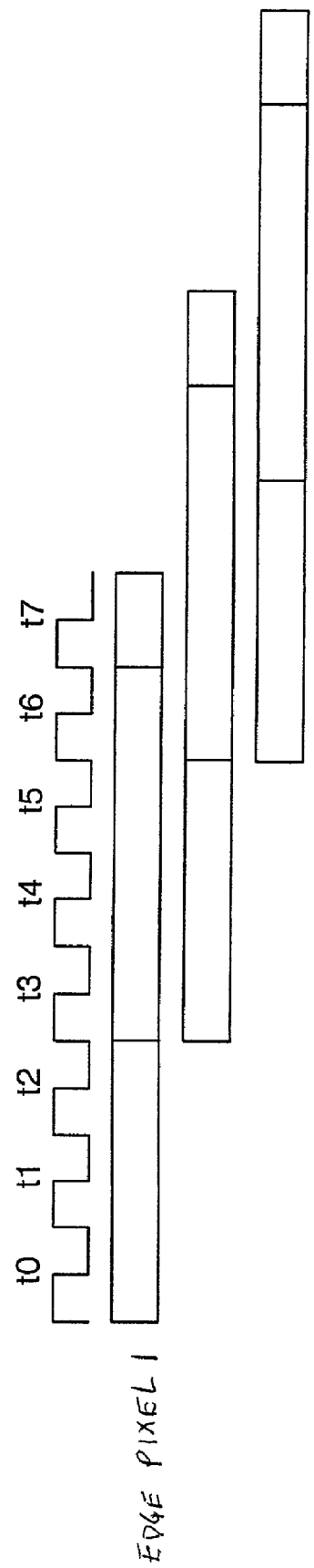
FIG. 10 is a timing diagram illustrating time periods involved in the operation of the mode 1 processing module shown in FIG. 8.

Referring to FIG. 10, module 42 performs the following operations during clock cycles t0-t7:

Process three input sets of pixels HGFE, FEDC, DCBA (FIG. 8A) so that for each set of pixels the following operations are performed: filter 4 input pixels three times with blocks 201-208 (FIG. 8A) and place the three results in blocks 208, 209, and 210. Using the values in blocks 208-210, compute the minimum of these with block 211. Add or subtract the center value of block 209 to the resulting minimum using block 223. At the same time, use the center neighborhood processed value of block 209 to compare with a quantization parameter DmQP using block 221 and block 222. In parallel to the above steps, block 240 (FIG. 8B) performs the following operations: process the 4 input pixels FEDC using FIR filter 243 and a transfer function programmed into the module 244 and shift 245. Use the two sets of pixels ED or FC as inputs to blocks 241 and 242. Using matching delay 246, select the output of blocks 209, 223 and 246 according to the selection indicated by the register signal DmEdgeSel (programmed by the main processor). The selected output of block 224 is adjusted and clipped by blocks 225, 226 and 229 using high and low clip values determined by the output of selectors 228 and 230. Following the processing path into the clip module 229, it can be deduced that the clip levels are influenced by the adjusted value of the center processed neighbors of block 209 and the processed input pixels of module 240. These selections can be modified by the values of register inputs into blocks 227, 228 and 230. Input pixels 254 are modified by blocks 252, 253, 255, 256 with processed data out of blocks 229, 248 and 249 respectively. The selection of blocks 229, 248 and 249 depends on selection criteria input to blocks 251 and 254.

Figure 11:
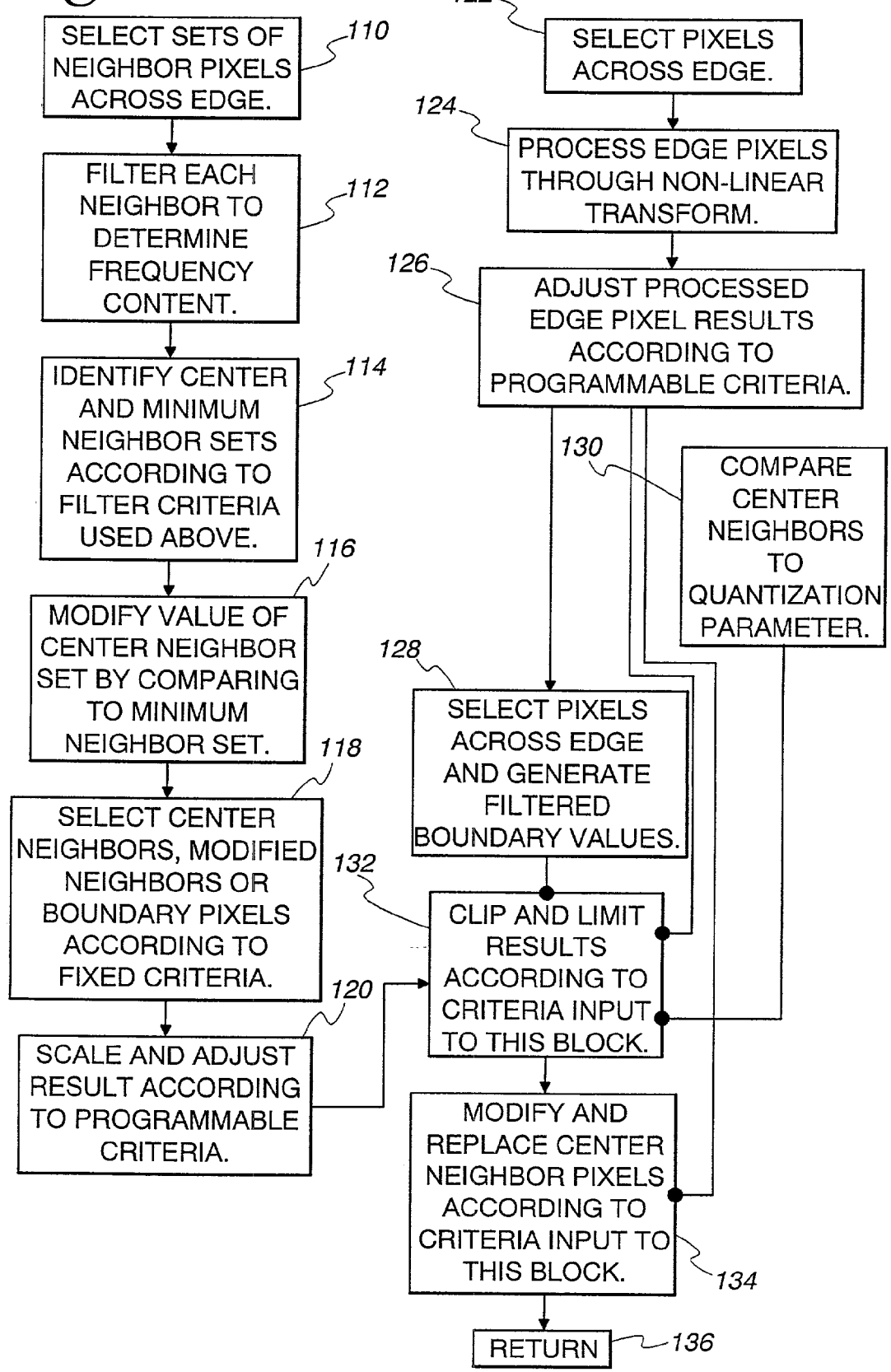
FIG. 11 is a flow diagram illustrating the operation of the mode 1 processing module shown in FIG. 8.

Module 42 performs default mode processing on MPEG-4 data or H.263 data as shown in FIG. 11. Module 42 operates on the pixel arrangement shown in FIG. 3. In a step 110, circuit block 200 of module 42 selects sets of neighbor pixels across an edge; in a step 112, block 200 filters each neighbor pixel to determine frequency content, and in a step 114, block 200 identifies center and minimum neighbor sets of pixels according to filter criteria defined by the values of registers indicated in Table 1, which indicates exemplary register settings for the exemplary processing modes. The range column indicates an exemplary range of values for the register settings. The register settings are obtained from register 18 (FIG. 1).

TABLE 1

| | MPEG-4 | H.263v2 | Range |
|---|---|---|---|
| 301 DCPwr2Coeffs | 1, −1, 0, 0 | X | −128 ... 128 |
| 301 DCPwr2Dvsr | 1 | X | −128 ... 128 |
| 302 DCPwr2Coeffs | 1, −1, 0, 0 | X | −128 ... 128 |
| 302 DCPwr2Dvsr | 1 | X | −128 ... 128 |
| 303 sgn, n, L/R__ | 0, 0, 0 | X | 0 ... 1, 0 ... 8, 0 ... 1 |
| 304 sgn, n, L/R__ | 0, 0, 0 | X | 0 ... 1, 0 ... 8, 0 ... 1 |
| 305 DCcompQ | from Stream | X | −256 ... 255 |
| 306 DCcompQ | from Stream | X | −256 ... 255 |
| 314 Pixel Select | 0 ... 1 | X | 0 ... 1 |
| 320 DC Coefficients | (1, 1, 2, 2, 4, 2, 2, 1, 1)//16 | X | −1.0 ... 1.0 |
| 331 DCcompQ2 | from Stream | X | −256 ... 255 |
| 332 sgn, n, L/R__ | 1, 0, 0 | X | 0 ... 1, 0 ... 8, 0 ... 1 |
| 334 +/− | − | | + or − |
| 201 DmK0 | 0.25 | X | −1.0 ... 1.0 |
| 202 DmK1 | −0.625 | X | −1.0 ... 1.0 |
| 203 DmK2 | 0.625 | X | −1.0 ... 1.0 |
| 203 DmK2 | −0.25 | X | −1.0 ... 1.0 |
| 211 DmMinSel | 1 | X | 0 ... 2 |
| 211 DmMinAbs | 1 | X | 0 ... 1 |
| 243 DmPwr2Coeffs | X | −4, 1, −1, 4 | −128 ... 128 |
| 243 DmPwr2Divsr | X | 8 | −128 ... 128 |
| 241 +/− | − | − | + or − |
| 242 sgn, n, L/R__ | 1, 1, 0 | 1, 2, 0 | 0 ... 1, 0 ... 8, 0 ... 1 |
| 244 LUT data | X | triangular function | 0 ... 255 |
| 244 LUT addr | X | strength address | 0 ... 64 |
| 244 DmUDscale | | 1 | −1.0 ... 1.0 |
| 244 LowR1 | X | 0 | |
| 244 LowR2 | X | 0 | |

TABLE 1-continued

|  | MPEG-4 | H.263v2 | Range |
|---|---|---|---|
| 245 sgn, n, L/R__ | X | 1, 1, 0 | 0 . . . 1, 0 . . . 8, 0 . . . 1 |
| 261 sgn, n, L/R__ | X | 0, 0, 1 | 0 . . . 1, 0 . . . 8, 0 . . . 1 |
| 263 +/− | X | − | + or − |
| 266 sgn, n, L/R__ | X | 0, 1, 1 | 0 . . . 1, 0 . . . 8, 0 . . . 1 |
| 267 +/− | X | − | + or − |
| 500 sel | X | 1 | 0 . . . 1 |
| 221 bypass | 0 | 0 | 0 . . . 1 |
| 222 DmQP | from Stream | 255 | −256 . . . 255 |
| 223 +/− | − | X | + or − |
| 224 DmEdgeSel | 1 | 2 | 0 . . . 2 |
| 225 DmGain | 1 | 1 | −1.0 . . . 1.0 |
| 226 sgn, n, L/R__ | 1, 0, 0 | 1, 0, 0 | 0 . . . 1, 0 . . . 8, 0 . . . 1 |
| 227 DmClpH | 0 | 255 | 0 . . . 255 |
| 228 DmEdgeClpH | X | 255 | 0 . . . 255 |
| 228 +/− | X | − | + or − |
| 228 DmClipModeH | 0 | 2 | 0 . . . 2 |
| 230 DmEdgeClpL | 0 | 0 | 0 . . . 255 |
| 230 DmClipModeL | 1 | 0 | 0 . . . 1 |
| 400 Input Pixels | EXXD | ABCD | ABCD/FEDC |
| 401 Output Pixels | exxd | abcd | abdc/fedc |
| 402 Input Pixels | XXXX | BADC | ABCD/FEDC |
| 254 DmOfst2 | X | X | 0 . . . 2 |
| 254 DmRampMode | X | 0 | 0 . . . 1 |
| 251 DmOfst1 | X | X | 0 . . . 255 |
| 251 DmEdgeMode | 1 | 1 | 0 . . . 2 |
| 252 +/− | − | − | + or − |
| 253 +/− | − | + | + or − |
| 255 +/− | X | − | + or − |
| 256 +/− | X | + | + or − |

NOTE:
"X" means don't care
NOTE:
"from Stream" means that the value is obtained directly from the compressed stream
NOTE:
Input and output pixels can be selected in any combination of the indicated FEDC or fedc 4-pixel sets
NOTE:
Coefficient k0 . . . k9 in 320 are programmable. This table gives one possible example
NOTE:
'Selectable' pixels mean that the actual input pixels are not limited to edge pixels In a step 116, circuit block 220 of module 42 modifies the value of a center neighbor pixel set by comparing to a minimum neighbor set of pixels; in a step 118, block 220 selects center neighbor pixels and modifies neighbor pixels or boundary pixels according to fixed criteria determined by the values of registers indicated by the input arrows with labels in the Figures and listed in Table 1 for the exemplary cases of MPEG-4 and H.263v2; in a step 120, block 220 scales and adjusts results according to programmable criteria determined by the values in registers indicated in the Figures and listed in Table 1.

In a step 122, circuit block 240 of module 42 selects pixels across an edge; in a step 124, block 240 processes the edge pixels by means of a non-linear transform; in a step 126, processing block 245 adjusts the processed edge pixel results according to programmable criteria determined by the values of registers in Table 1; in a step 128, processing block 242 of module 42 selects pixels across the edge and generates filtered boundary values for the pixels.

In a step 130, processing block 222 of module 42 compares center neighbor pixels to quantization parameters determined by the value of register DmQP.

In a step 132, processing block 229 clips and limits results according to criteria input to block 229 as a result of steps 128, 126 and 130.

In a step 134, circuit block 250 modifies and replaces center neighbor pixels according to criteria input to block 250 as a result of steps 126 and 132. In a step 136, the operation returns to step 110.

If the frame being processed was compressed using the H.263 algorithm, then in order to perform default mode processing with module 42, the processing blocks of FIGS. 8-9 indicated with values in the H.263v2 column of Table 1 are enabled, and the blocks of FIGS. 8-9 indicated with an X in the H.263v2 column in Table 1 are disabled by processor 10 in response to a first selection signal. Disabling of the blocks can be achieved by a variety of techniques. For example, a switch or a multiplexer may be used to bypass a block or to disconnect the input or output of a block. The power may be removed from a block. This technique is particularly useful for applications in which battery power needs to be conserved. Value(s) may be introduced that render a block inactive. For example, in FIG. 4a, A may be set equal to B so that the inequality is never true; in FIG. 4d, the clip high input may be set to the largest value used in the system so that the clip high value is never reached by the input data.

If the frame being processed was compressed using the MPEG-4 algorithm, then in order to perform default mode processing with module 42, processing blocks of FIGS. 8-9 indicated with values in the MPEG-4 column of Table 1 are enabled, and the blocks of FIGS. 8-9 indicated with an X are disabled by processor 10 in response to a second selection signal.

The processing blocks enabled for H.263 processing within module 42 comprise first circuits suitable for H.263 filtering, and the processing blocks enabled for MPEG-4 processing within module 42, together with the processing blocks of module 44, comprise second circuits suitable for MPEG-4 filtering. As shown in Table 1, there is some overlap between the first and second circuits. These first and second circuits collectively can be implemented on a single chip, thereby reducing costs and increasing performance. For MPEG-4 processing with module 44, the processing blocks of FIG. 12 (in the 300 range) indicated with values in the MPEP-4 column of Table 1 are enabled. For H.263v2 processing, the processing blocks of FIG. 12 (in the 300 range) are disabled as indicated by the Xs in the H.263v2 column of Table 1.

Regarding MPEG-4 filtering, the processing blocks within module 42 enabled for default processing comprise a first circuit group, and the processing blocks of module 44 enabled for DC offset processing comprise a second circuit group.

Figure 12:
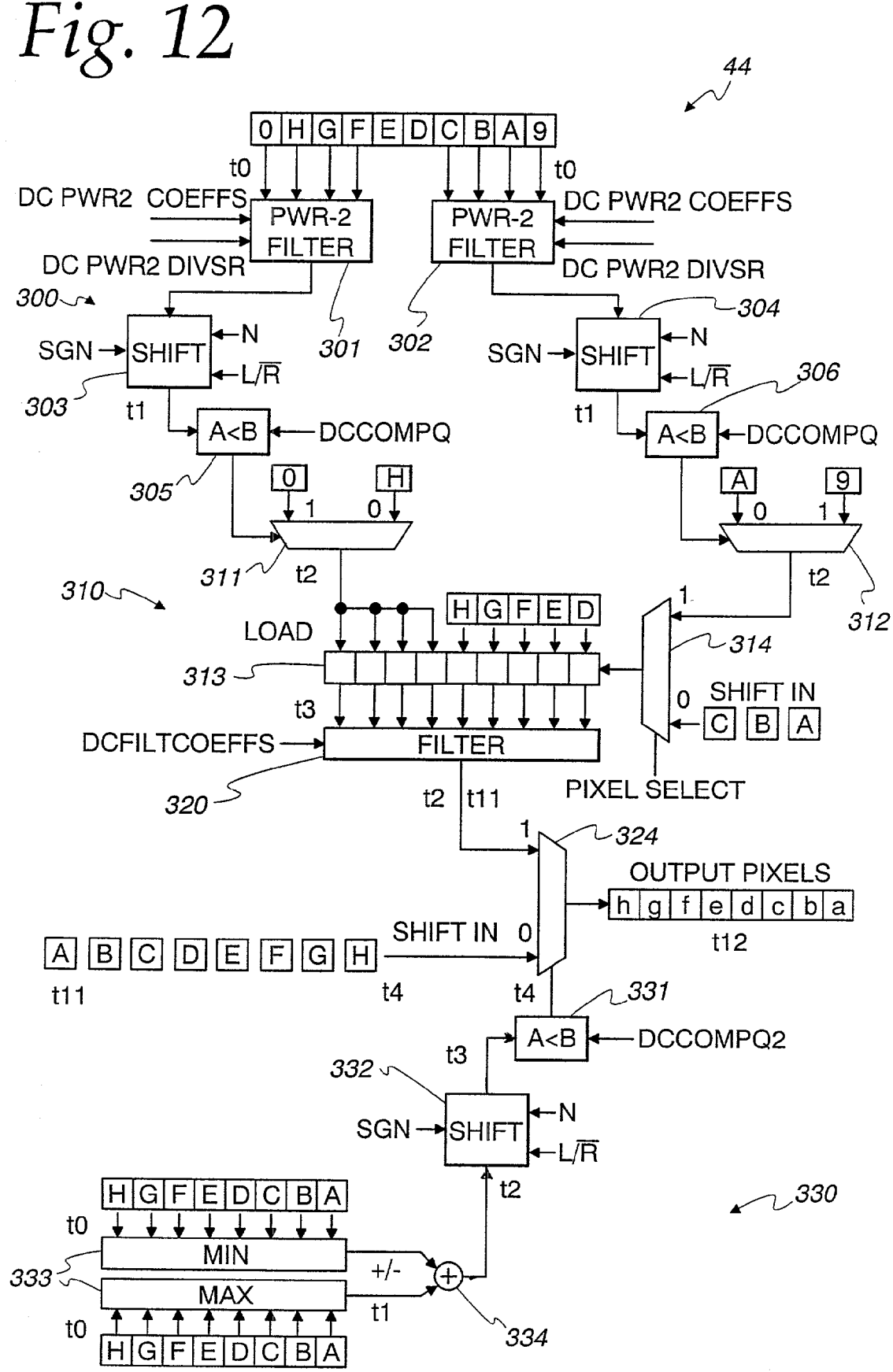
FIG. 12 is a schematic block diagram of the mode 2 processing module shown in FIG. 1.

DC offset mode processing for MPEG-4 pixels is performed by mode 2 processing module 44 shown in FIG. 12. Module 44 includes a circuit block 300 comprising processing blocks 301-306, a circuit block 310 comprising processing blocks 311-314, a processing block 320, a processing block 324, and a circuit block 330 comprising processing blocks 331-334, all connected as shown.

During MPEG-4 processing, when a strong DC difference between adjacent blocks is detected, the DC Offset Mode is activated by analyzer 32. In this mode, a strong filter is applied across a wide range of pixels across the horizontal or vertical edge as the case may be. Module 44 has the longest delay because potentially every neighbor across the edge may change its value depending on the analysis done on the input pixels. Module 44 can filter as little as neighboring two pixels to as much as neighboring eight pixels. For every DC Offset mode edge pixel result, two extra pixels are needed at the end of the filter. For example, for 8 pixels, 10 actual neighbor pixels are needed across the edge. As shown in FIG. 12, the processing of adjacent edge pixels can be pipelined.

The operation of module 44 is explained in FIG. 13. Module 44 operates on the pattern of pixels shown in FIG. 3. In a step 152, processing blocks 301-302 of circuit block 300 (FIG. 12) filter pixels at the extremes of an edge. In a step 154, circuit block 310 uses the filtered results to decide how to pad data at ends of the filter kernel. In a step 156, processing block 320 filters pixels across the edge, padding as directed by the results of step 154.

In a step 158, processing block 333 of circuit block 330 computes the maximum and minimum values of all pixels across the edge. In a step 160, processing blocks 332 and 334 combine the maximum and minimum values according to programmable criteria determined by the values of registers indicated in Table 1. In a step 162, processing block 331 compares results with quantization parameters determined by the value of register DccompQ2.

In a step 164, processing block 324 selects original or filtered pixels according to the decisions made in steps 158, 160 and 162. In a step 166, the operation returns to step 152.

Referring to FIGS. 12 and 14, the operation of module 44 during clock cycles t0-t12 is explained as follows:

Input pixels selected by the control processor 10 are filtered by the FIR filters 301 and 302 using powers-of-two coefficients indicated by the input registers to modules 301 and 302. The filtered results are further modified by blocks 303, 305 and blocks 304,306 in order to select padding pixels at the input of filter 320 by means of selectors 311 and 312. The padding pixels from selector 312 can be replaced by a shift in pixels CBA at the appropriate time when shifter 313 has loaded the initial values HGFED and the padded data from selector 311. The filter 320 creates output pixels selected by block 324 according to the conditions indicated by processing chain comprised of blocks 333, 334, 332 and 331. According to the value output from block 331, either input pixels or filtered pixels are selected as final output pixels at the output of selector 324. Exemplary register values are listed in Table 1.

Filter 30 also acts as a pixel interpolator during a macroblock motion compensation reconstruction. The macroblock motion compensation reconstruction process occurs when a reference macroblock is used as a prediction of another macroblock with the help of a set of motion vectors and a sub-pixel interpolator. In such an application, filter 30 serves as the sub-pixel interpolator.

The conditions upon which filter 30 can act as a pixel interpolator are as follows: the input pixels 9, A, B, . . . H, O are not limited to pixels at the edge between blocks, but can proceed from anywhere in the block. This means that the implicit addressing mechanism already taken into account in the deblocking process must 'feed' the correct pixels to the FIR filter structure. Processor 10 generates a third selection signal that enables interpolation. Since the FIR filter 320 (FIG. 12) can be programmed with any coefficients, then the resulting data from block 320 could very easily represent interpolated pixels. In this case, only mode 2 processing module 44 is active. Exemplary register values for pixel interpolation are shown in Table 2:

TABLE 2

| | Pixel Interpolation |
|---|---|
| 301 DCPwr2Coeffs | 0, 0, 0, 0 |
| 301 DCPwr2Dvsr | 1 |
| 302 DCPwr2Coeffs | 0, 0, 0, 0 |
| 302 DCPwr2Dvsr | 1 |
| 303 sgn, n, L/R__ | 0, 0, 0 |
| 304 sgn, n, L/R__ | 0, 0, 0 |
| 305 DCcompQ | −1 |
| 306 DCcompQ | −1 |
| 314 Pixel Select | 0 |
| 320 DC Coefficients | (0, −1, 5, 20, 20, 5, −1 0, 0)//32 |
| 331 DCcompQ2 | 1 |
| 332 sgn, n, L/R__ | 0, 0, 10 |
| 334 +/− | X |
| 201 DmK0 | X |
| 202 DmK1 | X |
| 203 DmK2 | X |
| 203 DmK2 | X |
| 211 DmMinSel | X |
| 211 DmMinAbs | X |
| 243 DmPwr2Coeffs | X |
| 243 DmPwr2Divsr | X |
| 241 +/− | X |
| 242 sgn, n, L/R__ | X |
| 244 LUT data | X |
| 244 LUT addr | X |
| 244 DmUDscale | |
| 244 LowR1 | X |
| 244 LowR2 | X |
| 245 sgn, n, L/R__ | X |
| 261 sgn, n, L/R__ | X |
| 263 +/− | X |
| 266 sgn, n, L/R__ | X |
| 267 +/− | X |
| 500 sel | X |
| 221 bypass | X |
| 222 DmQP | X |
| 223 +/− | X |
| 224 DmEdgeSel | X |
| 225 DmGain | X |
| 226 sgn, n, L/R__ | X |
| 227 DmClpH | X |
| 228 DmEdgeClpH | X |
| 228 +/− | X |
| 228 DmClipModeH | X |
| 230 DmEdgeClpL | X |
| 230 DmClipModeL | X |

TABLE 2-continued

| | Pixel Interpolation |
|---|---|
| 400 Input Pixels | Selectable |
| 401 Output Pixels | Selectable |
| 402 Input Pixels | Selectable |
| 254 DmOfst2 | X |
| 254 DmRampMode | X |
| 251 DmOfst1 | X |
| 251 DmEdgeMode | X |
| 252 +/− | X |
| 253 +/− | X |
| 255 +/− | X |
| 256 +/− | X |

NOTE:
"X" means don't care

NOTE:
"from Stream" means that the value is obtained directly from the compressed stream NOTE:
Input and output pixels can be selected in any combination of the indicated FEDC or fedc 4-pixel sets NOTE:
Coefficient k0 . . . k9 in 320 are programmable. This table gives one possible example NOTE:
'Selectable' pixels mean that the actual input pixels are not limited to edge pixels Referring to FIG. 1, the operations of analyzer 32 to determine the mode processing required, and the operations of modules 42 and 44 are performed in parallel, i.e., during the same time period, in order to reduce the amount of time required for filtering. During an appropriate clock cycle, multiplexer 46 transmits either the output pixels from module 42 or from module 44 to bus 58, depending on the mode processing required for a particular group of pixels as determined by analyzer 32. The output pixels are stored in buffer 16 and are transferred to SRAM 14 by control processor 10.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for processing data representing a first image compressed according to a first compression algorithm and a second image compressed according to a second compression algorithm, the first and second images each comprising pixels, the first compression algorithm being different from the second compression algorithm, the apparatus comprising:
a processing module comprising first circuits arranged to process the data and second circuits arranged to process the data;
a pixel analyzer arranged to select one of the first mode of filtering and the second mode of filtering according to first selection criterion and second selection criterion by performing the following:
determining the frequency distribution values of the portion of the data using a first selection criterion;
adding the frequency distribution values to generate a sum; and
generating a mode selection signal in response to the sum and a second selection criterion; and
a control processor arranged to enable at least a portion of the first circuits and disable at least a portion of the second circuits in response to a first selection signal in the event that the data represents the first image and to enable at least a portion of the second circuits and disable at least a portion of the first circuits in response to a second selection signal in the event that the data represents the second image,
wherein the processing module receives one of the first selection signal or the second selection signal, and
wherein the first selection criterion comprises a first register value equal to two and wherein the second selection criterion comprises a second register value equal to six.

2. The apparatus of claim 1 wherein at least a portion of the second circuits process the data by performing pixel interpolation in response to a third selection signal.

3. The apparatus of claim 1 wherein processing performed by the processing module comprises filtering.

4. The apparatus of claim 3 wherein the first circuits perform at least a first mode of filtering and wherein the second circuits perform at least a second mode of filtering.

5. The apparatus of claim 4 wherein the pixels comprise input block pixels comprising edge pixels and wherein the first mode of filtering comprises generating a combination of input block pixels and processed pixels depending on adaptive selection of the edge pixels.

6. The apparatus of claim 4 wherein the pixels comprise input block pixels that enable one of motion compensation reconstruction and DC offset filtering of a selectable plurality of neighboring pixels.

7. The apparatus of claim 3 wherein the pixel analyzer wherein the data comprises pixels arranged in blocks defining edge gradients and wherein the analyzer generates a first value of a mode selection signal in the event that the edge gradients between blocks are such that the average DC pixel values of adjacent blocks reduces the need for filtering of pixels along the edge of the blocks and generates a second value of a mode selection signal in the event that the DC difference between adjacent blocks is sufficiently large to justify filtering of pixels along the edge of the blocks.

8. The apparatus of claim 7 wherein the first circuits perform a first mode of filtering in response to the first selection signal and wherein the second circuits comprise a first circuit group that performs the first mode of filtering in response to the first value of the mode selection signal and a second circuit group that performs a second mode of filtering in response the second value of the mode selection signal.

9. The apparatus of claim 3 wherein the first circuits filter according to the H.263 standard and wherein the second circuits filter according to the MPEG-4 standard.

10. In a system comprising first circuits and second circuits for processing data representing a first image comprising pixels compressed according to a first compression algorithm and a second image comprising pixels compressed according to a second compression algorithm, the first compression algorithm being different from the second compression algorithm, the method comprising:
processing the data with the first circuits of a processor in response to a first selection signal in the event that the data represents the first image;
processing the data with the second circuits of the processor in response to a second selection signal in the event that the data represents the second image;
receiving, by the processor, one of the first selection signal and the second selection signal;
enabling at least a portion of the first circuits and disabling at least a portion of the second circuits in response to the first selection signal;
enabling at least a portion of the second circuits and disabling at least a portion of the first circuits in response to the second selection signal; and selecting one of the first mode of filtering and second mode of filtering according to a first selection criterion and a second selection criterion the following:
  determining the frequency distribution values of the portion of the data using the first selection criterion;
  adding the frequency distribution values to generate a sum; and
  generating a mode selection signal in response to the sum and the second selection criterion,
  wherein the first selection criterion comprises a first register value equal to two and wherein the second selection criterion comprises a second register value equal to six.

11. The method of claim 10 wherein said processing the data with the second circuits comprises performing pixel interpolation with at least a portion of the second circuits.

12. The method claim 11 wherein said processing the data with the first circuits and processing the data with the second circuits each comprises filtering.

13. The method of claim 12 wherein the filtering by the first circuits comprises at least a first mode of filtering and wherein the filtering by the second circuits comprises at least a second mode of filtering.

14. The method of claim 13 wherein the pixels comprise input block pixels comprising edge pixels and wherein the first mode of filtering comprises generating a combination of input block pixels and processed pixels depending on adaptive selection of the edge pixels.

15. The method of claim 13 wherein the pixels comprise input block pixels to enable one of motion compensation reconstruction and DC offset filtering of a selectable plurality of neighboring pixels.

16. The method of claim 12 wherein the data comprises pixels arranged in blocks defining edge gradients and wherein the method further comprises generating a first value of a mode selection signal in the event that the edge gradients between blocks are such that the average DC pixel values of adjacent blocks reduces the need for filtering of pixels along the edge of the blocks and generating a second value of a mode selection signal in the event that the DC difference between adjacent blocks is sufficiently large to justify filtering of pixels along the edge of the blocks.

17. The method of claim 16 wherein the first circuits perform a first mode of filtering in response to the first selection signal and wherein the second circuits comprise a first circuit group that performs the first mode of filtering in response to the first value of the mode selection signal and a second circuit group that performs a second mode of filtering in response the second value of the mode selection signal.

18. The method of claim 12 wherein the first circuits filter according to the H.263 standard and wherein the second circuits filter according to the MPEG-4 standard.

* * * * *